Patented Apr. 5, 1949

2,466,510

UNITED STATES PATENT OFFICE 2,466,510

BORATE OPTICAL GLASS

Kuan-Han Sun and Thomas E. Callear, Rochester, N. Y., assignors to Eastman Kodak Company, Rochester, N. Y., a corporation of New Jersey No Drawing. Application August 9, 1946, Serial No. 689,530

3 Claims. (Cl. 106—47)

This invention relates to a borate glass having optical properties rendering it particularly useful in the design of objectives in which it is coupled with a fluoride glass such as certain of those disclosed in the pending application of Sun and Huggins, Serial No. 568,314, filed December 15, 1944.

This glass consists mainly of the oxides of beryllium, calcium, lanthanum, and boron, and in addition to its desirable optical properties is particularly useful because of its durability against moisture attack and its resistance to devitrification in large-scale melting.

The following two examples are illustrative of the invention, the relative weight and molar percentages of the oxides being indicated in the columns under W and C. There are also given the index of refraction for the D line ($n_D$) and also, for the first example, the Abbé value ($\nu$) and the dispersion between some of the principal spectral lines and also the blue partial dispersion ratio, $$\nu_{gF}, \frac{(n_g - n_F)}{(n_F - n_C)}$$

|  | 1 | | 2 | |
|---|---|---|---|---|
|  | W | C | W | C |
| Beryllium oxide | 9 | 15 | 6.7 | 15 |
| Calcium oxide | 19 | 15 | 15.1 | 15 |
| Lanthanum oxide | 19 | 5 | 43.8 | 15 |
| Boron oxide | 53 | 65 | 34.4 | 55 |
| $n_D$ | 1.6273 | | 1.706 | |
| $\nu$ | 59.9 | | | |
| $n_F - n_C$ | 0.01047 | | | |
| $n_h - n_g$ | 0.00463 | | | |
| $n_g - n_F$ | 0.00559 | | | |
| $n_F - n_D$ | 0.00734 | | | |
| $gF$ | 0.5339 | | | |

In making these glasses, the raw materials in powdered form are carefully weighed and mixed and fed into a platinum pot at about 130° C. For a melt of one kilogram, the feeding takes about one hour. The temperature is then lowered to about 1150° C., and the liquid is stirred with a platinum stirrer driven by a motor for about 40 minutes. The liquid is then poured into a stainless steel mold previously heated to about 600° C. A clear colorless glass is obtained after cooling down slowly to room temperature.

While we consider as within our invention the addition of small amounts of other known glass ingredients, we consider our invention limited to the use of the four oxides mentioned as predominating in the glass composition; that is, totalling at least 80 per cent by either weight or molar percentage.

In any event, the boron dioxide would be at least 50 molar per cent; lanthanum oxide, 5 molar per cent; beryllium and calcium oxide, 10 molar per cent each.

Having thus described our invention, what we claim is:

1. An optical glass consisting by weight of beryllium oxide, 9 per cent; calcium oxide, 19 per cent; lanthanum oxide, 19 per cent; and boron oxide, 53 per cent.

2. An optical glass having high durability against moisture attack and high resistance to devitrification, consisting of ingredients compatible in glass and comprising essentially by weight: beryllium oxide, 6.5 to 9 per cent; calcium oxide, 15 to 19 per cent; lanthanum oxide, 19 to 44 per cent; boron oxide, 34 to 53 per cent; the total of the four oxides being at least 80 per cent.

3. An optical glass consisting by weight of lanthanum oxide, 19 to 44 per cent; beryllium oxide, 6.5 to 9 per cent; calcium oxide, 15 to 19 per cent; and boron oxide, 34 to 53 per cent.

KUAN-HAN SUN.
THOMAS E. CALLEAR.

REFERENCES CITED

The following references are of record in the file of this patent:

UNITED STATES PATENTS

| Number | Name | Date |
|---|---|---|
| 2,241,249 | Eberlin et al. | May 6, 1941 |
| 2,406,580 | Bastick et al. | Aug. 27, 1946 |

Certificate of Correction

Patent No. 2,466,510.

April 5, 1949.

KUAN-HAN SUN ET AL.

It is hereby certified that errors appear in the printed specification of the above numbered patent requiring correction as follows:

Column 1, line 42, for "130° C." read *1800° C.*; column 2, line 13, for the word "dioxide" read *oxide*;

and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*